US012586601B2

(12) United States Patent
Sprunger et al.

(10) Patent No.: US 12,586,601 B2
(45) Date of Patent: Mar. 24, 2026

(54) SNORING DETECTION SYSTEM

(71) Applicant: SKYWORKS SOLUTIONS, INC., Irvine, CA (US)

(72) Inventors: Joel Eugene Sprunger, Portland, OR (US); Colin Doolittle Fox, Tigard, OR (US); David Jacob Wurtz, Portland, OR (US)

(73) Assignee: SKYWORKS SOLUTIONS, INC., Irvine, CA (US)

( * ) Notice: Subject to any disclaimer, the term of this patent is extended or adjusted under 35 U.S.C. 154(b) by 215 days.

(21) Appl. No.: 18/104,444

(22) Filed: Feb. 1, 2023

(65) Prior Publication Data

US 2023/0253007 A1 Aug. 10, 2023

Related U.S. Application Data

(60) Provisional application No. 63/307,704, filed on Feb. 8, 2022.

(51) Int. Cl.

| | |
|---|---|
| ***H04R 1/40*** | (2006.01) |
| ***G10L 25/06*** | (2013.01) |
| ***G10L 25/18*** | (2013.01) |
| ***G10L 25/51*** | (2013.01) |
| ***H04R 3/00*** | (2006.01) |

(52) U.S. Cl.

CPC .............. *G10L 25/51* (2013.01); *G10L 25/06* (2013.01); *G10L 25/18* (2013.01); *H04R 1/406* (2013.01); *H04R 3/005* (2013.01); *H04R 2201/401* (2013.01)

(58) Field of Classification Search

CPC ........ H04R 1/405; H04R 3/005; H04R 1/406; H04R 2201/401; G10L 25/51; G10L 25/18

USPC ................................................ 381/56, 91–92

See application file for complete search history.

(56) References Cited

U.S. PATENT DOCUMENTS 7,835,529 B2 * 11/2010 Hernandez ......... G10K 11/1783 381/71.8
9,532,138 B1 * 12/2016 Allen ..................... H04R 3/005
11,435,429 B2 * 9/2022 Cordourier Maruri ...................... G01S 3/8083
11,589,178 B2 * 2/2023 Tisch ..................... H04R 5/027
11,711,648 B2 * 7/2023 Lopatka .................. G10L 25/30 381/92

(Continued)

FOREIGN PATENT DOCUMENTS

WO WO-2022136726 A1 * 6/2022 ......... G10L 21/0208

*Primary Examiner* — Disler Paul
(74) *Attorney, Agent, or Firm* — Lando & Anastasi, LLP

(57) ABSTRACT

A system for detecting snoring. The system includes a first microphone to convert a first sound into a first signal, a second microphone to convert a second sound into a second signal, and a processor. The processor generates a third signal from the first and second signals that is representative of the first sound arriving at the first microphone and the second sound arriving at the second microphone to select first and second portions of the third signal, and to derive a metric from the second portion of the third signal. The first portion corresponds to the first sound arriving at the first microphone and the second sound arriving at the second microphone. The second portion contains only components of the first portion that have a frequency within a frequency range of interest. The metric indicates if the first portion of the third signal includes a component consistent with snoring.

22 Claims, 11 Drawing Sheets

(56) References Cited

U.S. PATENT DOCUMENTS

| | | | | |
|---|---|---|---|---|
| 11,776,562 | B2 * | 10/2023 | Li | G10L 25/78<br>704/233 |
| 11,778,370 | B2 * | 10/2023 | Wang | H04R 1/403<br>381/86 |
| 11,961,535 | B2 * | 4/2024 | Trella | G10L 15/22 |
| 12,102,472 | B2 * | 10/2024 | Den Brinker | A61B 5/7282 |
| 2012/0163622 | A1 * | 6/2012 | Karthik | H04R 3/005<br>381/94.1 |
| 2021/0219074 | A1 * | 7/2021 | Zhang | G10K 11/175 |
| 2024/0062769 | A1 * | 2/2024 | Tammi | G10L 21/0264 |
| 2024/0171907 | A1 * | 5/2024 | Birkenes | G10L 21/0208 |

* cited by examiner

SNORING DETECTION SYSTEM

CROSS-REFERENCE TO RELATED APPLICATIONS

This application claims priority under 35 U.S.C. § 119(e) to U.S. Provisional Patent Application Ser. No. 63/307,704, titled "SNORING DETECTION SYSTEM," filed Feb. 8, 2022, the entire contents of which is incorporated herein by reference for all purposes.

BACKGROUND

Field

Aspects and embodiments of the present disclosure relate to systems and methods for detecting snoring.

Description of the Related Technology

Known methods for alleviating snoring include making adjustments to the surface of the bed on which a user is sleeping. Such adjustments are designed to place the user in a position known to reduce snoring.

Some methods of detecting snoring are based on the use of a single microphone. The microphone is used to capture audio in an environment in which snoring may be present. Signal processing techniques are then used to determine if the captured audio signal is consistent with snoring.

SUMMARY

According to an aspect of the present disclosure there is provided a method for detecting a sound generated by an entity during sleep. The method comprises using a first microphone to convert a first sound into a first electrical signal; using a second microphone to convert a second sound into a second electrical signal, the first and second microphones being spatially separated; generating a third electrical signal from the first electrical signal and the second electrical signal, the third electrical signal being representative of the first sound arriving at the first microphone and the second sound arriving at the second microphone from a plurality of directions; selecting a first portion of the third electrical signal, the first portion corresponding to the first sound arriving at the first microphone and the second sound arriving at the second microphone from a direction of interest at each of a plurality of sample points; selecting a second portion of the third electrical signal, the second portion containing only components of the first portion that have a frequency within a frequency range of interest; deriving a metric from the second portion of the third electrical signal, the metric indicating if the first portion of the third electrical signal includes a component consistent with a sound generated by an entity during sleep; and generating an output if the metric indicates that the first portion of the third electrical signal includes a component consistent with the sound generated by an entity during sleep.

In one example generating the third electrical signal may include measuring a similarity between the first electrical signal and the second electrical signal.

In one example generating the third electrical signal may include cross correlating the first electrical signal and the second electrical signal.

In one example cross correlating may include using a generalized cross correlation function.

In one example using a generalized cross correlation function may include using a Fast Fourier transform to generate a Fourier transform of the first electrical signal and the second electrical signal.

In one example a Fourier transform of the first electrical signal and the second electrical signal may be generated between every 2 milliseconds to 6 milliseconds.

In one example the Fast Fourier transform may be a 256 point Fast Fourier transform.

In one example cross correlating may generate an output including correlation for a plurality of time delays in arrival between the first sound at the first microphone and the second sound at the second microphone.

In one example each of the plurality of time delays in arrival may correspond to the first sound arriving at the first microphone and the second sound arriving at the second microphone from a physical direction at a sample point.

In one example selecting the first portion of the third electrical signal may include selecting a subset of the output, the subset having time delays in arrival that correspond to a physical area of interest.

In one example the method may further comprise smoothing the subset of the output from frame to frame to reduce noise in the subset.

In one example smoothing may include using exponential smoothing.

In one example selecting the first portion of the third electrical signal may include selecting a maximum signal from the subset of the output at each sample point.

In one example the first portion of the third electrical signal may be representative of how the physical direction from which the first sound arrives at the first microphone and the second sound arrives at the second microphone changes in time.

In one example the method may further comprise normalizing the first portion of the third electrical signal.

In one example selecting the second portion of the third electrical signal may include generating a Fourier transform of the first portion of the third electrical signal.

In one example generating the Fourier transform of the first portion of the third electrical signal may include using a Fast Fourier transform.

In one example generating the Fourier transform may include generating a buffer of a magnitude Fast Fourier transform of the first portion of the third electrical signal.

In one example the buffer may be between 10 seconds and 25 seconds long.

In one example selecting the second portion of the third electrical signal may include selecting a subset of the Fourier transform, the subset corresponding to the frequency range of interest.

In one example the frequency range of interest may correspond to a characteristic frequency range of the sound generated by the entity during sleep.

In one example the sound generated by the entity during sleep may be a sound generated by the entity snoring.

In one example the frequency range of interest may correspond to a breathing rate of 1.5 seconds per breath to 6 seconds per breath.

In one example deriving the metric may include calculating a difference between a maximum value and a minimum value in the subset of the Fourier transform.

In one example the metric may vary with time.

In one example the metric may indicate that the first portion of the third electrical signal comprises a component consistent with a sound produced by an entity during sleep if the metric rises above a first threshold.

In one example the method may further comprise indicating that the first portion of the third electrical signal no longer comprises a component consistent with the sound produced by the entity during sleep if the metric subsequently falls below a second threshold.

In one example the method may further comprise defining a first direction from a point between the first microphone and second microphone towards a position of the first microphone.

In one example an angle corresponding to the direction of interest may comprise a component in the first direction.

In one example the method may further comprise selecting a third portion of the third electrical signal, the third portion corresponding to the first sound arriving at the first microphone and the second sound arriving at the second microphone from a second direction of interest.

In one example the method may further comprise defining a second direction from the point between the first and second microphones towards a position of the second microphone.

In one example an angle corresponding to the second direction of interest may comprise a component in the second direction.

According to another aspect of the present disclosure there is provided a system for detecting a sound generated by an entity during sleep The system comprises a first microphone configured to convert a first sound into a first electrical signal; a second microphone configured to convert a second sound into a second electrical signal, the first and second microphones being spatially separated; and a processor configured to generate a third electrical signal from the first electrical signal and the second electrical signal, the third electrical signal being representative of the first sound arriving at the first microphone and the second sound arriving at the second microphone from a plurality of directions, to select a first portion of the third electrical signal, the first portion corresponding to the first sound arriving at the first microphone and the second sound arriving at the second microphone from a direction of interest at each of a plurality of sample points, to select a second portion of the third electrical signal, the second portion containing only components of the first portion that have a frequency within a frequency range of interest, to derive a metric from the second portion of the third electrical signal, the metric indicating if the first portion of the third electrical signal includes a component consistent with a sound generated by an entity during sleep, and to generate an output if the metric indicates that the first portion of the third electrical signal includes a component consistent with the sound generated by an entity during sleep.

In one example the third electrical signal may be based on a cross correlation between the first electrical signal and the second electrical signal.

In one example the cross correlation may use a generalized cross correlation function.

In one example the generalized cross correlation function may use a Fast Fourier transform to generate a Fourier transform of the first electrical signal and the second electrical signal.

In one example a Fourier transform of the first electrical signal and the second electrical signal may be generated between every 2 milliseconds to 6 milliseconds.

In one example the Fast Fourier transform may be a 256 point Fast Fourier transform.

In one example an output of the cross correlation may include correlation for a plurality of time delays in arrival between the first sound at the first microphone and the second sound at the second microphone.

In one example each of the plurality of time delays in arrival may correspond to the first sound arriving at the first microphone and the second sound arriving at the second microphone from a physical direction at a sample point.

In one example the first portion of the third electrical signal may include a subset of the output, the subset having time delays in arrival that correspond to a physical area of interest.

In one example the processor may be further configured to smooth the subset of the output from frame to frame to reduce noise in the subset.

In one example the processor may be further configured to smooth the subset of the output using exponential smoothing.

In one example the first portion of the third electrical signal may include a maximum signal from the subset of the output at each sample point.

In one example the first portion of the third electrical signal may be representative of how the physical direction from which the first sound arrives at the first microphone and the second sound arrives at the second microphone changes in time.

In one example the processor may be further configured to normalize the first portion of the third electrical signal.

In one example the second portion of the third electrical signal may be based on a Fourier transform of the first portion of the third electrical signal.

In one example the Fourier transform of the first portion of the third electrical signal may be generated using a Fast Fourier transform.

In one example the Fast Fourier transform may include generating a buffer of a magnitude Fast Fourier transform of the first portion of the third electrical signal.

In one example the buffer may be between 10 seconds and 25 seconds long.

In one example the second portion of the third electrical signal may include a subset of the Fourier transform, the subset corresponding to the frequency range of interest.

In one example the frequency range of interest may correspond to a characteristic frequency range of the sound generated by an entity during sleep.

In one example the sound generated by an entity during sleep may be a sound generated by the entity snoring.

In one example the frequency range of interest may correspond to a breathing rate of 1.5 seconds per breath to 6 seconds per breath.

In one example the metric may be based on a difference between a maximum value and a minimum value in the subset of the Fourier transform.

In one example the metric may vary with time.

In one example the metric may indicate that the first portion of the third electrical signal comprises a component consistent with a sound produced by an entity during sleep if the metric rises above a first threshold.

In one example the processor may be further configured to indicate that the first portion of the third electrical signal no longer comprises a component consistent with the sound generated by the entity during sleep if the metric subsequently falls below a second threshold.

In one example a first direction may be defined from a point between the first microphone and the second microphone towards a position of the first microphone.

In one example an angle corresponding to the direction of interest may comprise a component in the first direction.

In one example the processor may be further configured to select a third portion of the third electrical signal, the third portion corresponding to the first sound arriving at the first microphone and the second sound arriving at the second microphone from a second direction of interest.

In one example a second direction may be defined from a point between the first microphone and the second microphone towards a position of the second microphone.

In one example an angle corresponding to the second direction of interest may comprise a component in the second direction.

In one example the system may further comprise a third microphone and a fourth microphone.

According to another aspect of the present disclosure there is provided a system for detecting a sound generated by an entity during sleep. The system is configured to use a first microphone to convert a first sound into a first electrical signal; use a second microphone to convert a second sound into a second electrical signal, the first and second microphones being spatially separated; generate a third electrical signal from the first electrical signal and the second electrical signal, the third electrical signal being representative of the first sound arriving at the first microphone and the second sound arriving at the second microphone from a plurality of directions; select a first portion of the third electrical signal, the first portion corresponding to the first sound arriving at the first microphone and the second sound arriving at the second microphone from a direction of interest at each of a plurality of sample points; select a second portion of the third electrical signal, the second portion containing only components of the first portion that have a frequency within a frequency range of interest; derive a metric from the second portion of the third electrical signal, the metric indicating if the first portion of the third electrical signal includes a component consistent with a sound generated by an entity during sleep; and generate an output if the metric indicates that the first portion of the third electrical signal includes a component consistent with the sound generated by an entity during sleep.

According to another aspect of the present disclosure there is provided a system for detecting a sound generated by an entity during sleep, The system comprises a first microphone configured to convert a first sound into a first electrical signal; a second microphone configured to convert a second sound into a second electrical signal, the first and second microphones being spatially separated; a processor configured to generate a third electrical signal from the first electrical signal and the second electrical signal, the third electrical signal being representative of the first sound arriving at the first microphone and the second sound arriving at the second microphone from a plurality of directions, to select a first portion of the third electrical signal, the first portion corresponding to the first sound arriving at the first microphone and the second sound arriving at the second microphone from a direction of interest at each of a plurality of sample points, to select a second portion of the third electrical signal, the second portion containing only components of the first portion that have a frequency within a frequency range of interest, to derive a metric from the second portion of the third electrical signal, the metric indicating if the first portion of the third electrical signal includes a component consistent with a sound generated by an entity during sleep, and to generate an output if the metric indicates that the first portion of the third electrical signal includes a component consistent with the sound generated by an entity during sleep; and a bed including a moveable bed base and a moveable mattress, the moveable bed base and moveable mattress being configured to adjust their positioning in response to the output.

In one example the bed base and mattress may be configured to support the entity during sleep.

In one example the direction of interest may correspond to a location of the entity on the mattress.

In one example the bed base and mattress may be further configured to adjust a position of the entity in response to the output.

In one example the position of the entity may be adjusted by an amount that is proportional to an amount of time for which the metric has indicated that the first portion of the third electrical signal includes a component consistent with the sound generated by an entity during sleep.

In one example the position of the entity may be continually adjusted up to a maximum position or until the metric no longer indicates that the first portion of the third electrical signal includes a component consistent with the sound generated by an entity during sleep.

In one example the position of the entity may be adjusted by an amount that is proportional to a loudness of the sound generated by an entity during sleep.

In one example the bed may further comprise a headboard.

In one example the first microphone and the second microphone may be positioned on the headboard.

In one example the first microphone and the second microphone may project from the headboard.

In one example the first microphone and the second microphone may be positioned in a line of sight of the entity.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1:
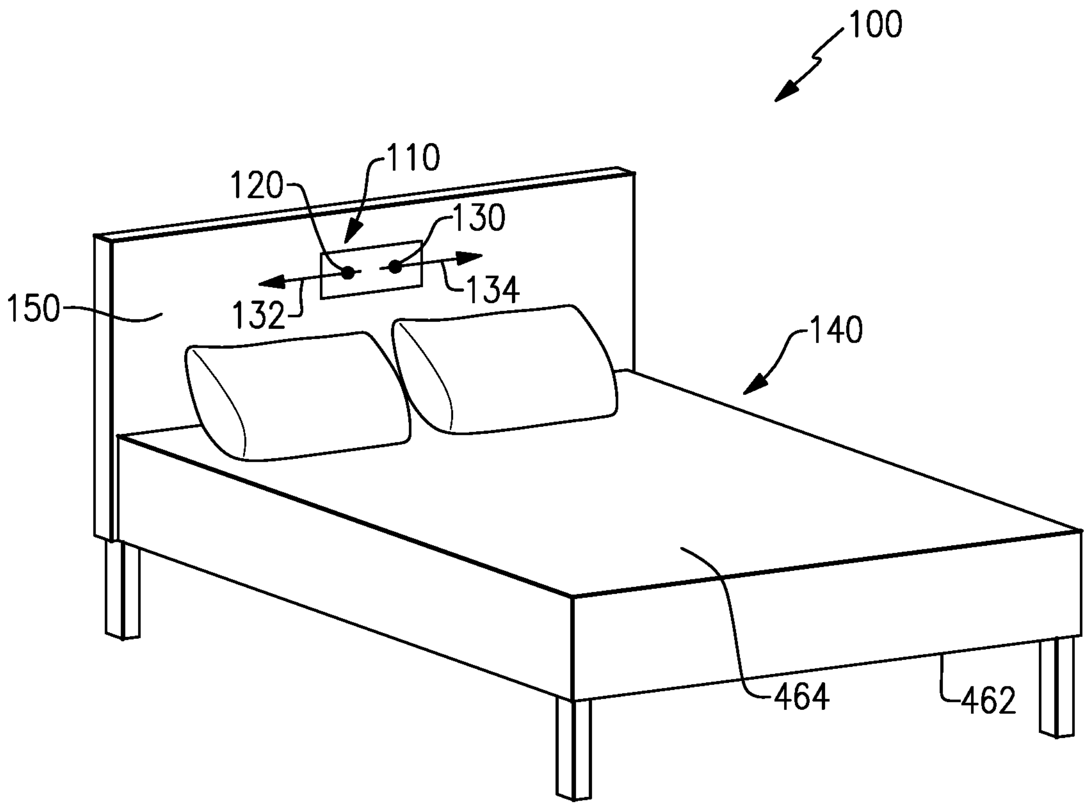
FIG. 1 is a schematic diagram of an example snoring detection system according to aspects of the present disclosure.

Aspects and embodiments of the disclosure described herein are directed to a system and method for detecting snoring.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Snoring is when breathing becomes noisy during sleep. Snoring is the result of obstructed air flow through the nose and/or mouth. Known methods for detecting snoring have relied on techniques such as Formant Analysis or performing Spectrograms on an audio stream as an input to a Convolutional Neural Network. Such methods rely on a single microphone. Although single microphone systems are able to indicate whether snoring is present in an audio signal, they do not address the location or the direction of the snoring. They are further unable to detect and distinguish multiple sources of snoring.

In summary, the inventors of the snoring detection system and method described herein have appreciated that it is advantageous to determine the direction from which snoring originates. This is achieved by using a two microphone system as opposed to a known single microphone system. The use of two microphones is significant. By capturing audio at two spatially separated microphones, information regarding the direction from which sound is arriving at the microphones can be obtained. From this directional information, it can be determined if the sound arriving at the microphones from an area of interest corresponds to a sound generated by snoring. This is achieved by assessing if a signal representing sound arriving at the microphones from the area of interest comprises a component within a frequency range that is characteristic of a sound produced by snoring.

The above-described method and system has particular applicability in the context of smart beds shared by more than one user. By positioning the two microphones such that they are able to capture audio in the surroundings of the bed, it can be determined if sound arriving at the microphones from an area of interest is consistent with a sound produced by a user snoring. Measures can then be taken to alleviate the snoring. Such measures include adjusting the position of a user, by way of moveable components of the bed, whose location on the bed corresponds to that area of interest. The snoring detection system and method is described in more detail below with reference to example embodiments.

According to some aspects of the present disclosure, a system for detecting snoring is provided that is able to determine the direction from which snoring originates.

FIG. 1 illustrates a snoring detection system 100 according to aspects of the present invention. The system comprises a microphone array 110. The microphone array 110 comprises a first microphone 120 and a second microphone 130. The first microphone 120 is referred to herein as the left microphone. The second microphone 130 is referred to herein as the right microphone. The left microphone 120 and the right microphone 130 are spatially separated. The spatial separation between the left microphone 120 and the right microphone 130 allows directional information about sound arriving at microphone array 110 to be obtained. The distance between the first microphone 120 and the second microphone 130 is typically in the range 4 cm to 15 cm.

Specifically, the distance between the microphones 120, 130 in this example is 8 cm. Using two microphones allows directional information to be obtained with respect to two directions. A first direction defined from the midpoint between the left microphone 120 and the right microphone 130 towards a position of the left microphone 120 is referred to herein as the left direction (indicated by arrow 132 of FIG. 1). A second direction defined from the midpoint between the left microphone 120 and the right microphone 130 towards a position of the right microphone 130 is referred to herein as the right direction (indicated by arrow 134 of FIG. 1). The microphone array 110 is located in the surroundings of a bed 140. Specifically, the array 110 is positioned such that it is in the line of sight of where snoring is likely to originate. Specifically, in this example, the microphone array 110 is positioned in the headboard 150 of the bed 140. This allows the left microphone 120 and right microphone 130 to capture audio from the surroundings of the bed 140, in which sounds produced by snoring may exist. In other examples, the microphone array 110 may project from the headboard 150 of the bed 140. This is in a similar style to the overhead lamps often found attached to the headboards of hotel beds. The system 100 further comprises a processor. The processor is configured to implement the snoring detection method described below.

Figure 2:
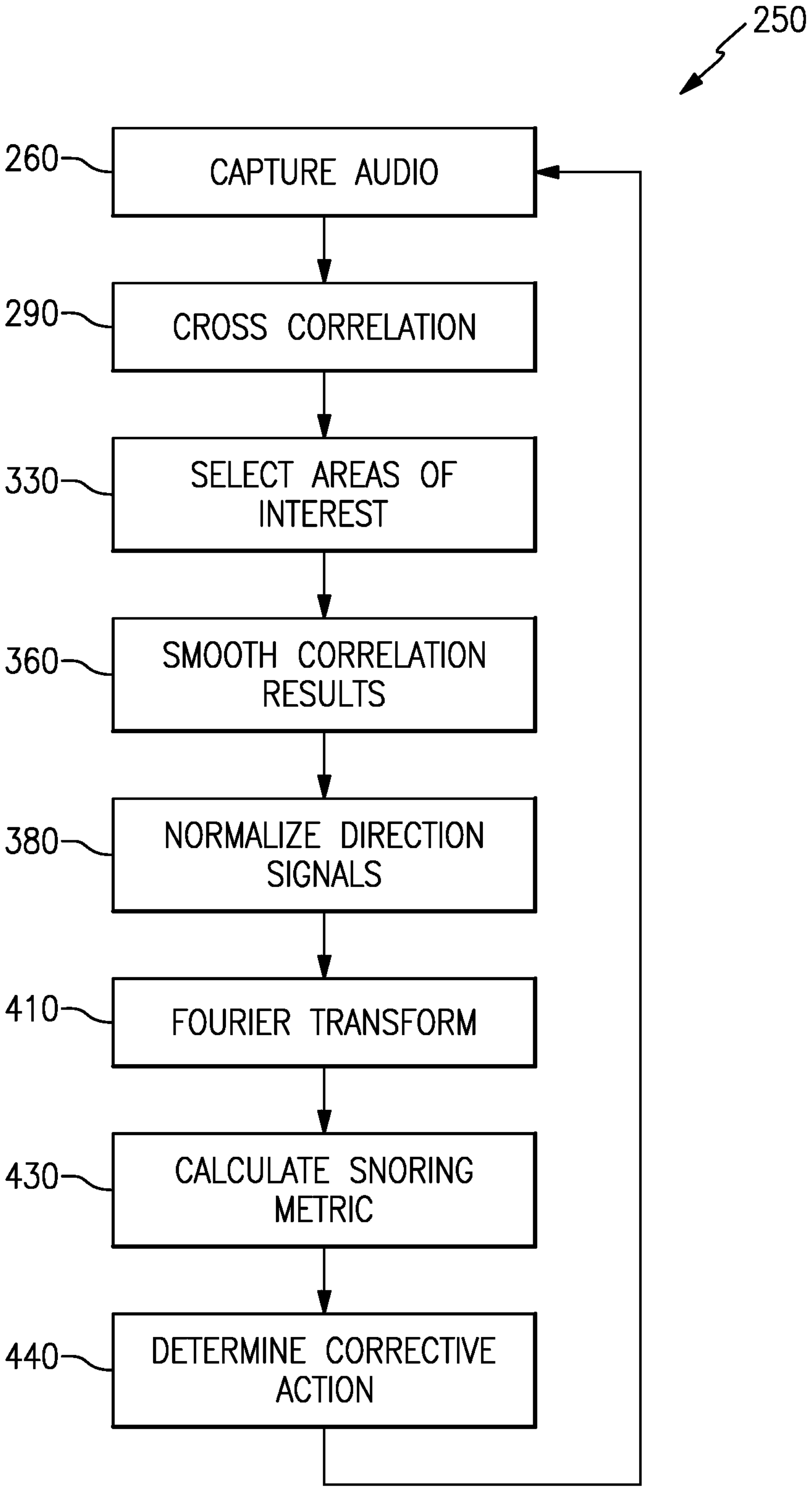
FIG. 2 is a flowchart describing the snoring detection method implemented by the system of FIG. 1 according to aspects of the present disclosure.
Figure 3:
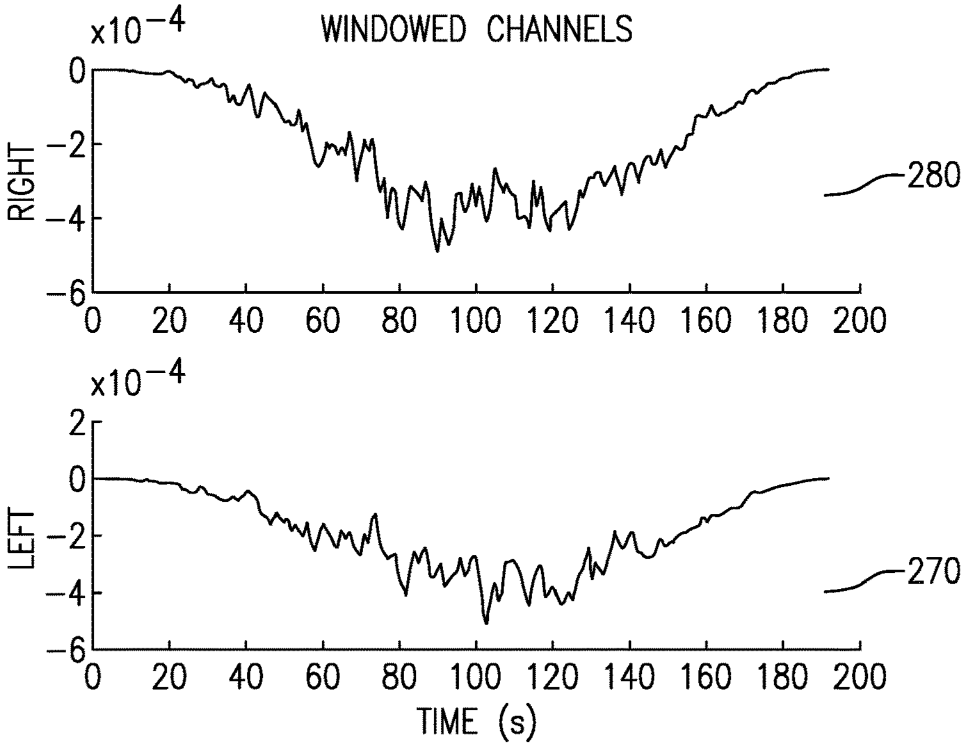
FIG. 3 is a set of graphs depicting example audio signals captured by the left microphone and the right microphone of the system of FIG. 1 according to aspects of the present disclosure.

FIG. 2 is a flowchart 250 summarizing the snoring detection method implemented by system 100 during use. In a first step, an audio signal is captured at the left microphone 120 and an audio signal is captured at the right microphone 130 (block 260 of FIG. 2). Herein, the term audio signal is used to refer to an electrical signal that is representative of a sound as captured by a microphone. The audio signals captured by the left 120 and right 130 microphones are representative of sound present in the surroundings of the bed 140. However, the spatial separation of the microphones 120, 130 leads to a time delay in arrival at each microphone 120, 130 for sound emanating from the same source. Audio is sampled at a level which is sufficient to capture the frequency expected from a sound produced by snoring. Such sampling parameters are typically within the following ranges: a sampling rate between 30 kHz and 65 kHz, 150 to 250 samples per frame, and 2 ms to 6 ms frames. Specifically, in this example, the microphones 120, 130 each capture 192 samples per frame, with a sampling rate of 48 kHz, and 4 ms frames. The captured audio signals are windowed with a Hanning window. FIG. 3 shows example windowed signals as a function of time. Graph 270 displays the audio signal captured by the left microphone 120. Graph 280 displays the audio signal captured by the right microphone 130.

Figure 4:
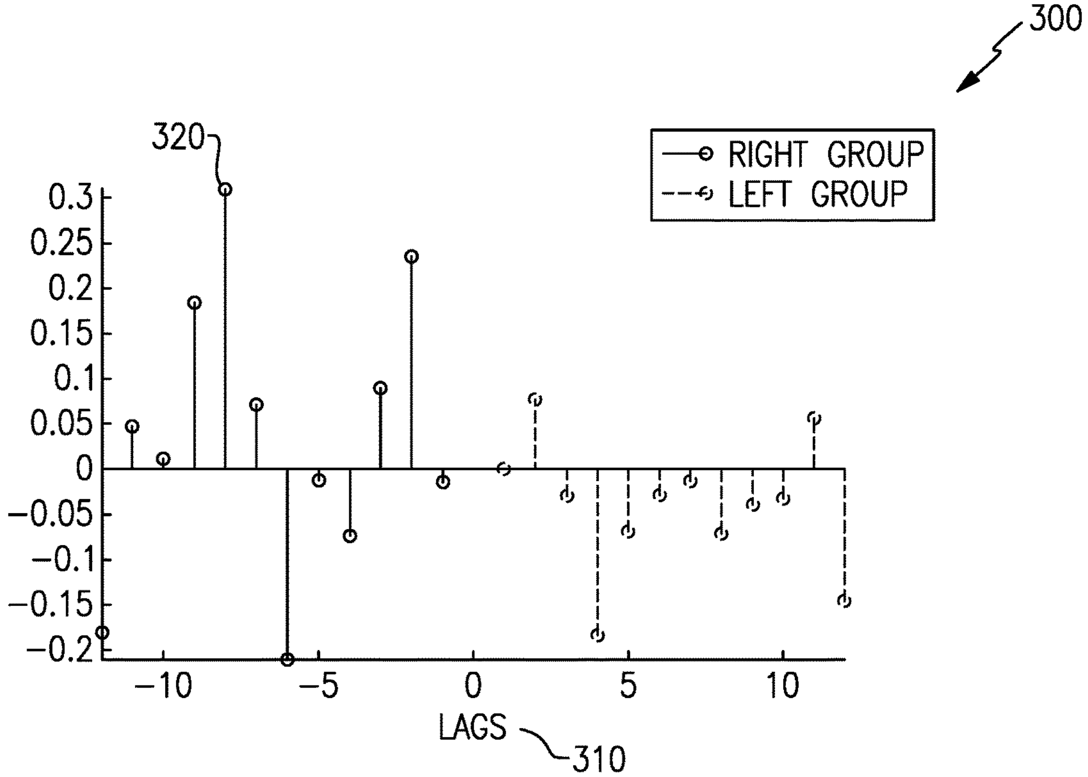
FIG. 4 is a graph depicting a subset of the output obtained by performing cross correlation on the audio signals of FIG. 3 according to aspects of the present disclosure.

In a next step (block 290 of FIG. 2), the windowed audio signals 270, 280 are processed to obtain directional information. This is done by cross correlating the signal 270 captured by the left microphone 120 and the signal 280 captured by the right microphone 130. The output of the cross correlation indicates the direction relative to the microphone array 110 from which sound represented by the signals 270 and 280 arrived. In the example described herein, this is done using a known generalized cross correlation function (GCCPHAT). The cross correlation is generated by multiplying the Fourier transforms of the signals 270 and 280 in the time domain. The Fourier transforms are computed using a Fast Fourier transform (FFT). In the example discussed herein, a 256 point FFT is used. A 256 point FFT strikes a balance between obtaining sufficient directionality information whilst still being able to perform the cross correlation using hardware of moderate complexity. Using a FFT is a quick method of cross correlating two signals. It is also computationally efficient. FIG. 4 shows a subset 300 of the overall GCCPHAT output for the signals 270 and 280 shown in FIG. 3. The output indicates the correlation between the signal 270 captured by the left microphone 120 and the signal 280 captured by the right microphone 130 for each of a number of lags 310 (also referred to herein as bins). In other words, GCCPHAT computes the time delay in arrival of sound as captured by the left 120 and right 130 microphones. The points 320 on graph 300 represent time delays. This is calculated on the order of every few milliseconds. In other words, it is calculated at a plurality of sample points.

Figure 5:
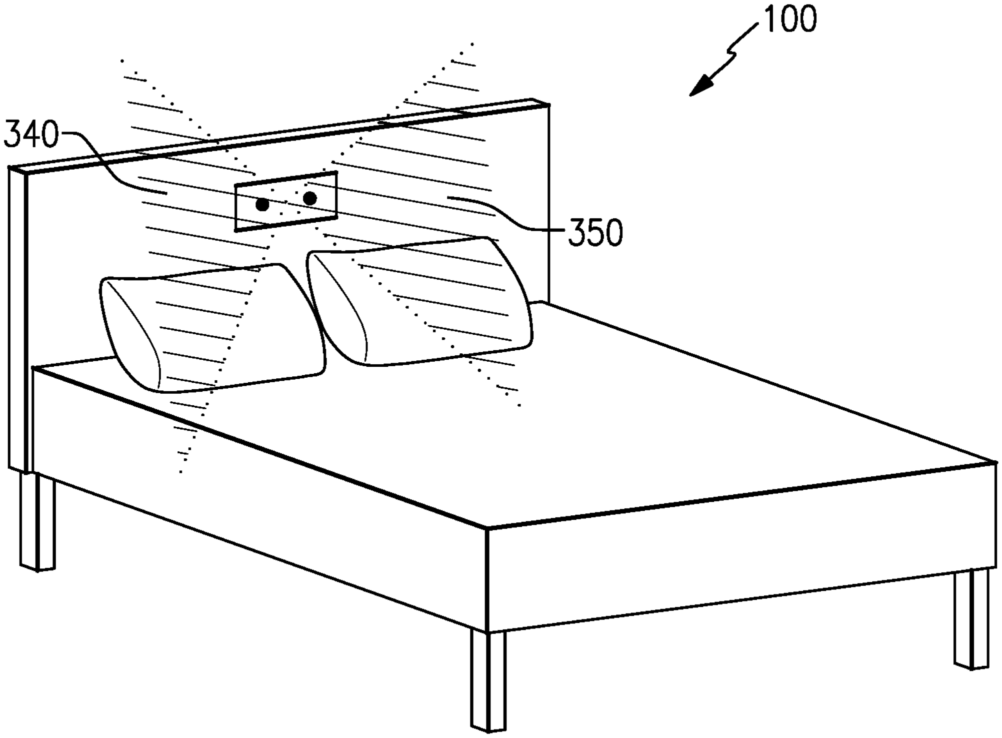
FIG. 5 is the diagram of FIG. 1 further illustrating the areas of interest according to aspects of the present disclosure.

From the cross correlation output, a left area of interest and right area of interest is selected. These areas are defined by selecting a subset of lags 310 that correspond to sound arriving at the microphone array 110 from a plurality of direction angles. These direction angles are those from which a sound produced by snoring is likely to originate in the surroundings of the bed 140. The subset of lags 310 comprises the first n bins and the last N−n bins, where N is the total number of bins of the GCCPHAT output and n indicates the number of bins of interest in each direction (left and right). For clarity, the lags 310 are re-labelled −n to n. This corresponds to sound arriving broadside of the microphone array 110+/− some angles. Positive lags 310 correspond to direction angles with a component in the left direction (forming the left area of interest). Sound coming from the left area of interest is generally referred to herein as coming from the left direction. Negative lags 310 correspond to direction angles with a component in the right direction (forming the right area of interest). Sound coming from the right area of interest is generally referred to herein as coming from the right direction. In other words, the GCCPHAT output for n bins of interest indicates the arrival strength of the detected audio signal for 2n different direction angles relative to the microphone array 110. Lags 310 corresponding to the left area of interest and right area of interest are indicated in the graph 300 of FIG. 4. The spikes 320 in the graph 300 at certain lags 310 correspond to a sound arriving from one of the direction angles with respect to the position of the microphone array 110. To cover the directions from which a sound produced by snoring is likely to originate in the surroundings of the bed 140, the value of n is typically in the range 5 to 25. Specifically, in the example described herein, n=12 (ignoring a lag of 0 as this represents sound arriving broadside of the microphone array, and our interest is sound arriving from the left and right areas of interest). As discussed above, although the lags 310 have been labelled −12 to +12, in a real implementation, because of the nature of a FFT, the lags 310 are actually 0 to 11 and 116 to 127. The left area of interest 340 and right area of interest 350 of system 100 are illustrated in FIG. 5. In the example described herein, only the direction of sounds with reference to the left and right directions are of interest. However, the analysis may be expanded to more than just these two directions. Such directions of interest may include center (i.e., broadside of the microphone array 110), and far left and far right (i.e. direction angles with a larger component in the left and right directions respectively).

Figure 6:
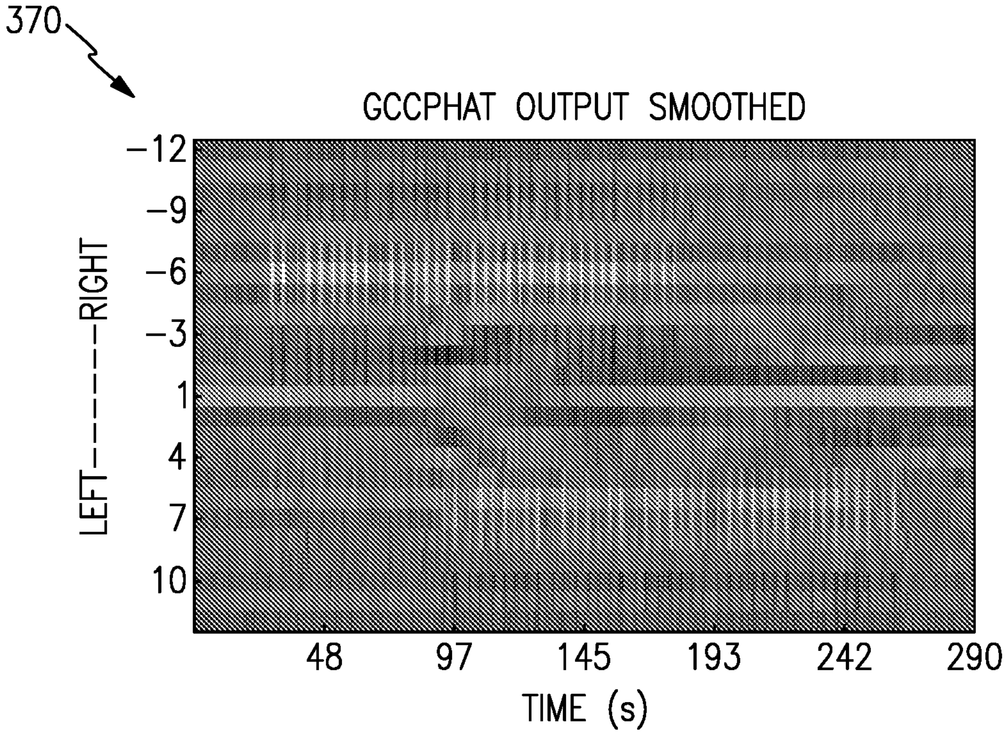
FIG. 6 is a signal strength map depicting the result of smoothing the output of the cross correlation of FIG. 4 according to aspects of the present disclosure.

Once the areas of interest have been selected, the subset of lags 310 is stored for each side. The data over time is then smoothed (block 360 of FIG. 2). Smoothing is necessary to reduce noise in the bins 310 from frame to frame. The result of the smoothing on the subset of lags of FIG. 4 is shown in FIG. 6. The smoothed bins are presented in the form of a signal strength map 370. The signal strength map illustrates the relative height of the smoothed bins 310 over time. A peak in the map 370 shows that the bin 320 is higher than neighboring bins 310 at that instant in time. This indicates that the sound is coming from the direction angle corresponding to that lag 320. In this example, exponential smoothing has been used. The exponential smoothing is described by the following Equation 1: $y_{new}=y_{old}(1-\alpha)+\alpha x$, where $\alpha$ is the smoothing factor, $y_{new}$ is the height of the bin after smoothing, and $y_{old}$ is the height of the bin before smoothing. The value of the smoothing factor is chosen to be sufficient to reduce noise in the data before further processing. The value of $\alpha$ is typically in the range 0.3 to 0.7. Specifically, in the example of FIG. 6, $\alpha=0.5$.

Figure 7:
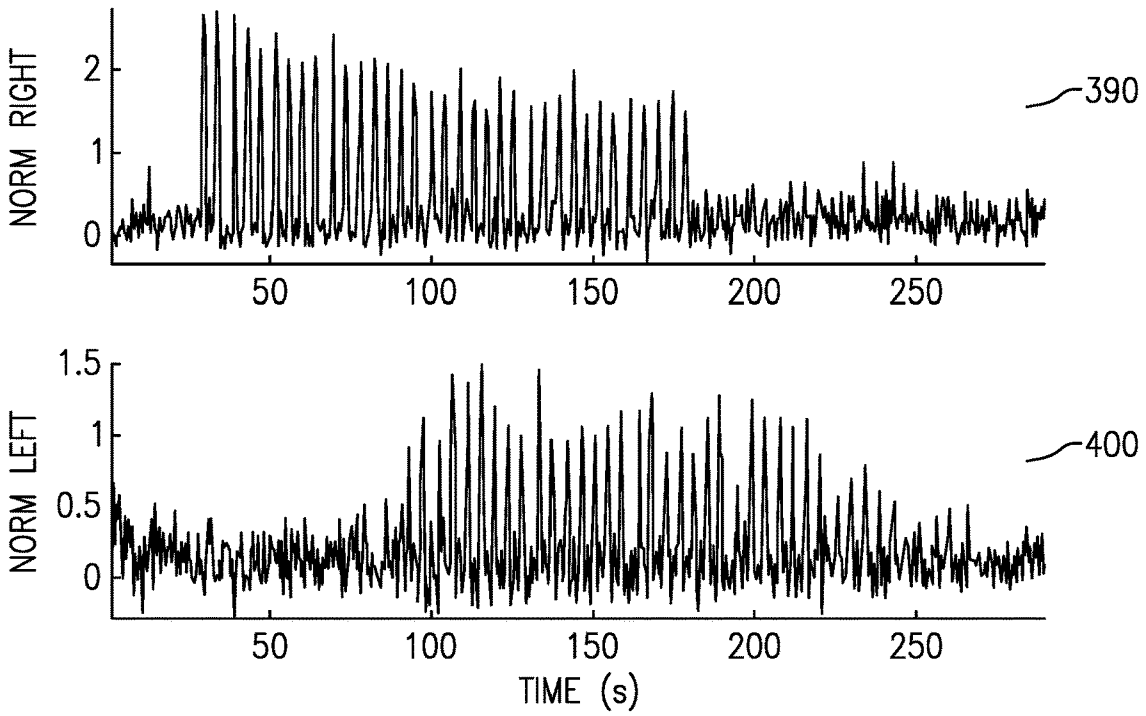
FIG. 7 is a set of graphs depicting the normalized maximum left and right direction signals obtained from the output of FIG. 6 according to aspects of the present disclosure.

The maximum value in the smoothed left and smoothed right subsets is then selected for each sample point. As discussed above, a peak in the signal strength map 370 at a particular instant in time indicates that sound is coming from the direction represented by that lag at that time (also referred to herein a direction of interest). The result from the left subsets is a signal that is representative of how the directionality of sound arriving at the microphone array 110 from the left area of interest changes in time (referred to herein as the left maximum direction signal). The result from the right subsets is a signal that is representative of how the directionality of sound arriving at the microphone array 110 from the right area of interest changes in time (referred to herein as the right maximum direction signal). The left and right maximum direction signals are then normalized (block 380 of FIG. 2). The signals are normalized in order to reduce error when subsequently determining if there is a sound produced by snoring coming from the left and right areas of interest. The normalization converts quiet and loud snoring into a power range on which thresholds can be applied. The result of the normalization on the maximum direction signals derived from FIG. 6 is shown in FIG. 7. Graph 390 shows the normalized right maximum direction signal. Graph 400 shows the normalized left maximum direction signal. In the example described herein, the normalization process includes using exponential smoothing to track the floor of the signals. It is desirable to have a signal floor of 0. Microphone offsets, for example, can lead to a non-zero floor. A non-zero floor can also be an artefact from the processing discussed above. The floor can also drift from zero as time progresses. Essentially, normalization facilitates the use of uncalibrated microphones. To track the floor, exponential smoothing is used with a slow attack, fast release algorithm. The slow attack ignores spikes in the maximum direction signals. The fast release quickly tracks the floor of the maximum direction signals. The terms 'slow' and 'fast' are relative to the maximum direction signals. The exponential smoothing follows the same general Equation 1 presented above. The parameter $\alpha$ controls the speed of the slow attack and fast release. The value of $\alpha$ is, therefore, chosen to provide a sufficiently slow attack to ignore spikes in the maximum direction signals when the signal is above the envelope. For the slow attack, $\alpha$ is typically in the range 0.01 to 0.09. Specifically, in this example, $\alpha=0.02$. Similarly, the value of $\alpha$ is chosen to provide a sufficiently fast release to track the floor of the maximum direction signals when the signal is below the envelope. For the fast release, $\alpha$ is typically in the range 0.1 to 0.4. Specifically, in this example, $\alpha=0.2$. The maximum direction signals are then normalized (block 380 of FIG. 2) using the following Equations 2 and 3 respectively: $left_{norm}=(max_{left}-left_{floor})/(left_{floor}+\varepsilon)$ and $right_{norm}=(max_{right}-right_{floor})/(right_{floor}+\varepsilon)$, where $max_{left}$ and $max_{right}$ are respectively the left and right maximum direction signals, $\varepsilon$ is a small value, and $left_{floor}$ and $right_{floor}$ are respectively the floor of the left maximum direction signal and the floor of the right maximum direction signal. The addition of $\varepsilon$ to $left_{floor}$ and $right_{floor}$ in Equations 2 and 3 is to account for the scenario in which the value $left_{floor}$ is zero and the scenario in which the value of $right_{floor}$ is zero. The value of $\varepsilon$ is typically in the range 0.01 to 0.05. Specifically, in this example, $\varepsilon=0.02$. After normalization using Equations 2 and 3, the mean of the $left_{norm}$ signal is subtracted from the $left_{norm}$ signal and the mean of the $right_{norm}$ signal is subtracted from the $right_{norm}$ signal.

As described above, snoring has a characteristic frequency. This characteristic frequency is the result of a characteristic user breathing rate. In the context of the maximum direction signals 390, 400, this translates to a characteristic frequency at which the directionality of sound arriving at the microphone array 110 changes. In other words, snoring leads to 'peaks' in the signal strength map 370 that are captured by the maximum direction signals 390, 400. After normalization, whether there is a component consistent with the characteristic breathing rate in the normalized left maximum direction signal 400 and normalized right maximum direction signal 390 is determined. The characteristic user breathing rate is defined as being within a range of 1.5 seconds per breath to 6 seconds per breath. Although in the example discussed herein, the range of interest is chosen to be that commonly associated with snoring, in other examples the range may be chosen to detect other sounds produced by a user during sleep (e.g., due to sleep apnea or catathrenia). To determine whether the maximum direction signals 390, 400 comprise a component consistent with a sound produced by snoring requires long term observation of the maximum direction signals 390, 400. This is to capture the frequency at which directionality is changing over time. The Fourier transform of each of the left and right normalized maximum direction signals is computed (block 410 of FIG. 2). This is done by way of an FFT. The FFT is a longer time scale FFT than that used for cross correlation (block 290 of FIG. 2). A more detailed explanation is provided with reference to the second embodiment discussed below. The FFT converts $left_{norm}$ and $right_{norm}$, from the time domain to the frequency domain. The subset of bins corresponding to a breathing rate of 1.5 seconds per breath to 6 seconds per breath is then selected from the Fourier transform of both the left and right normalized maximum direction signals. In other words, a portion of each of the maximum direction signals 390, 400 is selected that contains only components that have a frequency within a frequency range of interest, the frequency range of interest corresponding to the characteristic user breathing rate. For each of the left and right portions, a maximum value in this frequency range and minimum value in this frequency range is selected. A snoring metric is then derived from each of the left and right portions (block 430 of FIG. 2). The snoring metric is defined as the maximum value minus the minimum value in this frequency range (i.e., the difference between them). This produces a snoring metric for each of the left and right areas of interest that varies with time. The left snoring metric indicates if the left maximum direction signal 400 comprises a component that is consistent with a sound produced by snoring (i.e., if there is snoring coming from the left area of interest 340). Likewise, the right snoring metric indicates if the right maximum direction signal 390 comprises a component that is consistent with a sound produced by snoring (i.e., if there is snoring coming from the right area of interest 350).

Figure 8:
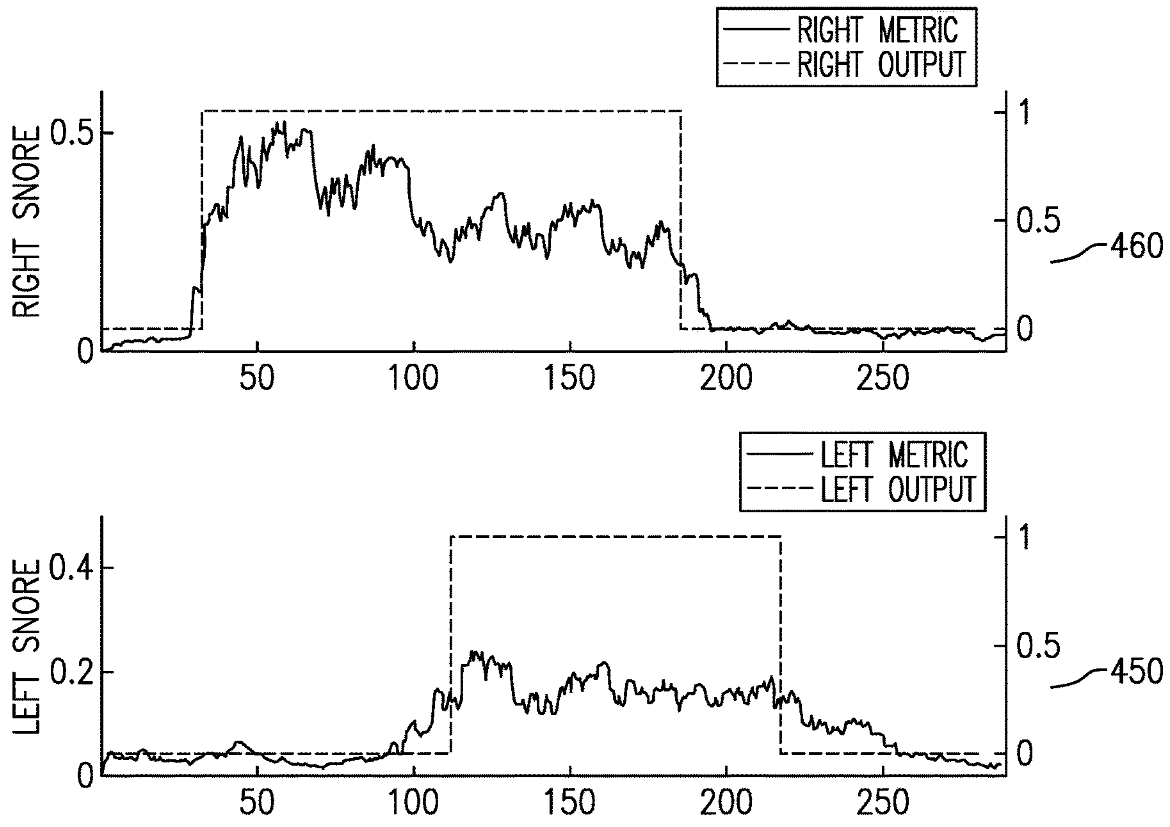
FIG. 8 is a set of graphs depicting the snoring metrics and system outputs obtained from the maximum direction signals of FIG. 7 according to aspects of the present disclosure.

To determine whether there is a sound produced by snoring coming from each of the left and right areas of interest, two thresholds are used. Using two thresholds provides hysteresis. The snoring metrics derived from the maximum direction signals 390, 400 of FIG. 7 are depicted in the graphs of FIG. 8. Graph 450 shows the snoring metric derived from the left maximum direction signal 400. Graph 460 shows the snoring metric derived from the right maximum direction signal 390. The system outputs are superimposed on graphs 450 and 460. Considering the left and right metrics separately, when the snoring metric rises above an upper threshold, an output of the snoring detection system 100 indicates that the maximum direction signal from which the metric was derived comprises a component that is consistent with a sound produced by snoring. In other words, that snoring is coming from the area of interest the metric represents. In the example discussed herein, this is indicated by an output of 1 on the graphs of FIG. 8. If the snoring metric then subsequently falls below a lower threshold (also referred to herein as a second threshold), an output of the snoring detection system 100 indicates that the maximum direction signal from which the metric was derived does not comprise a component that is consistent with a sound produced by snoring. In other words, that snoring is not coming from the area of interest the metric represents. In the example discussed herein, this is indicated by an output of 0 on the graphs of FIG. 8. In this way, it can be determined if there is a sound produced by snoring coming from the left and right areas of interest.

Measures can be taken to alleviate snoring in response to detecting a sound produced by snoring. What corrective action is required is determined using the snoring metric (block 440 of FIG. 2). Referring back to the system shown in FIG. 1, the bed 140 comprises a bed base 462. The bed base 462 supports a mattress 464. During use, a user lies on the mattress 464, oriented such that their head is adjacent to the headboard 150. The bed 140 is configured to be used by more than one user at the same time, typically two. Relative to the position of the microphone array 110 in the headboard 150, the position of one user will be in the left direction 132. The position of the other user will be in the right direction 134. In this way, if it is determined by system 100 that a sound produced by snoring is coming from the left area of interest, it is reasonable to assume that the user in the left direction 132 is snoring. Likewise, if it is determined by system 100 that a sound produced by snoring is coming from the right area of interest, it is reasonable to assume that the user in the right direction 134 is snoring. Both the bed base 462 and mattress 464 are moveable. The system 100 further comprises means (not shown) to move the bed base 462 and mattress 464 into a position known to alleviate snoring in a user. An example of such a position raises a portion of the bed base 462 and mattress 464 such as to raise the torso and head of the user relative to the lower half of their body. The amount by which the portion of the bed base 462 and mattress 464 is raised is typically in the range 0° to 50° from its initial position. The maximum displacement of the bed base 462 and mattress 464 defines a minimum height from the bed base 462 and mattress 464 at which the microphone array 110 must be positioned. This is to ensure that microphones 120 and 130 are not obstructed such as to impede their ability to capture audio. In other examples this is achieved with a moveable headboard that is raised with the bed base and mattress. In other examples, this is achieved by having a microphone array that is not positioned on any part of the bed. In response to detecting that the user in the left direction 132 is snoring, a portion of the bed base 462 and mattress 464 in the left direction is moved to assume a position to alleviate snoring in that user. Likewise, in response to detecting that the user in the right direction 134 is snoring, a portion of the bed base 462 and mattress 464 in the right direction is moved to assume a position to alleviate snoring in that user. In some examples, the amount by which the portion of the bed base 462 and mattress 464 is raised is proportionate to how long it has been detected that a user is snoring. In such an example, the portion of the bed base 462 and mattress 464 will rise continuously in response to a detection of snoring until it has been detected that the snoring has stopped or until the maximum position has been reached. In other examples, the amount by which the portion of the bed base 462 and mattress 464 is raised is proportionate to how loud the snoring is.

According to aspects of the present disclosure, a snoring detection system 100 is provided which is able to determine the direction from which snoring originates. By detecting which direction the snoring is coming from, measures can be taken to alleviate the snoring, as discussed above.

Figure 9:
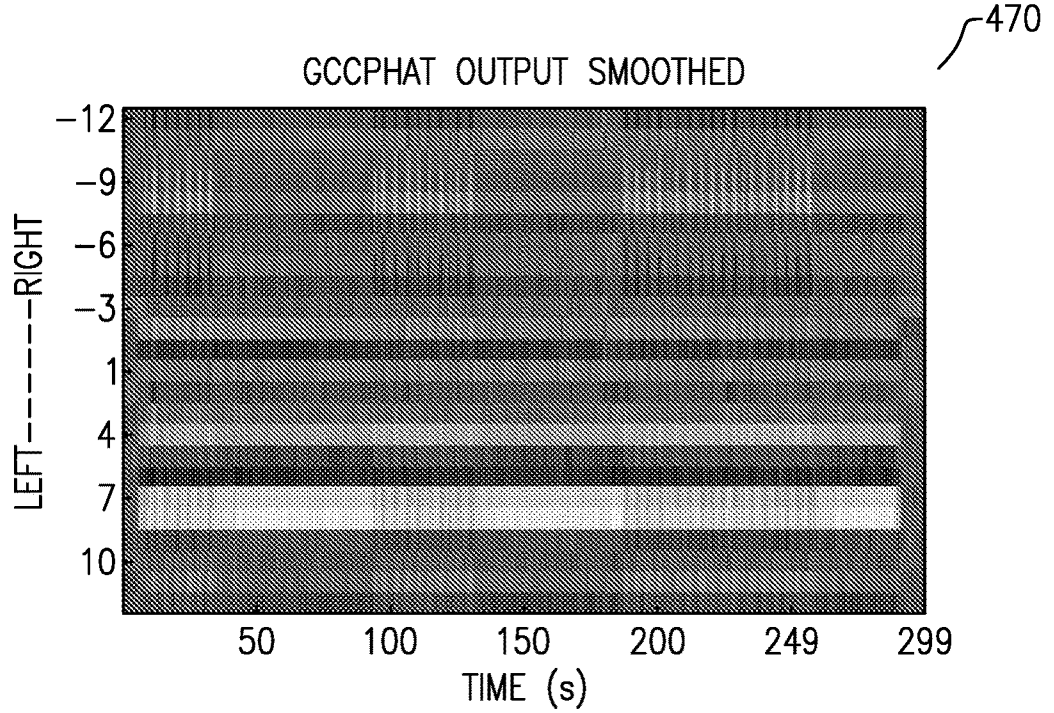
FIG. 9 is a signal strength map depicting a smoothed cross correlation output representative of an environment in which there is a noise originating from an air conditioner in the left direction and snoring in the right direction according to aspects of the present disclosure.
Figure 10:
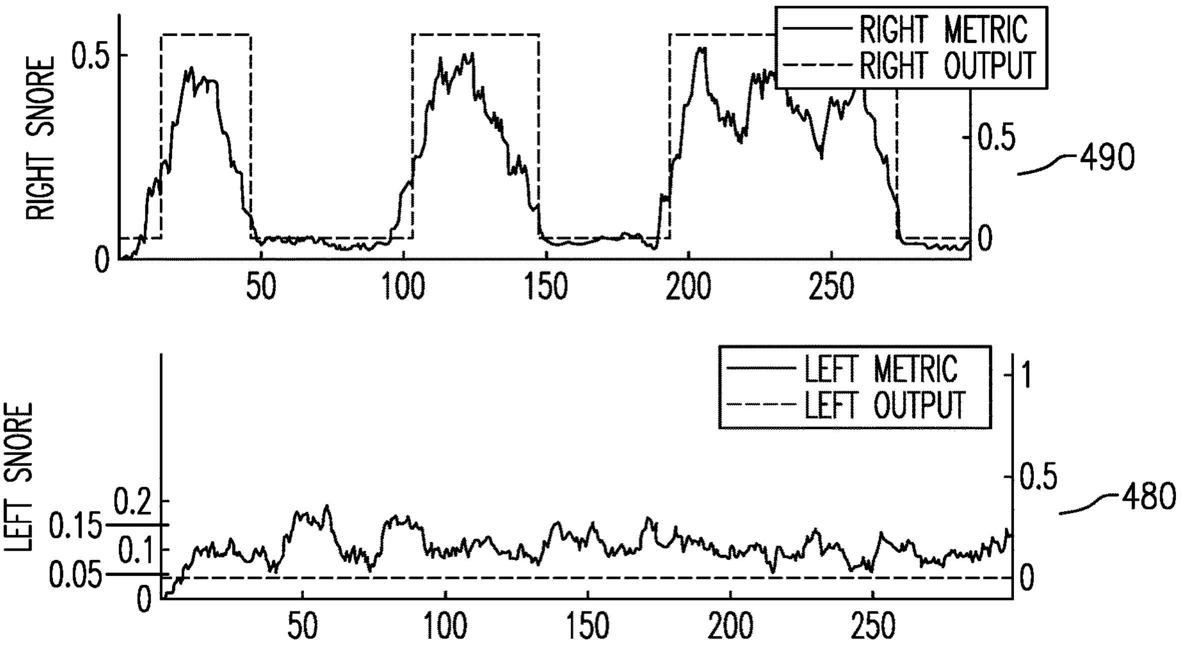
FIG. 10 is a set of graphs depicting the snoring metrics and system outputs obtained from the output of FIG. 9 according to aspects of the present disclosure.
Figure 11:
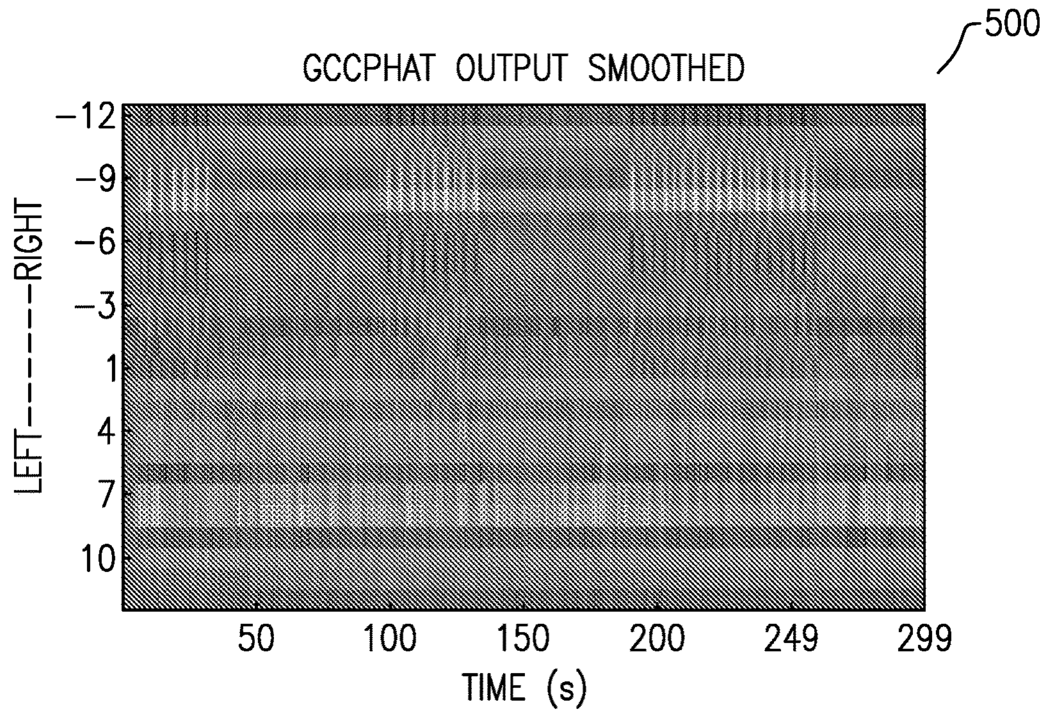
FIG. 11 is a signal strength map depicting a smoothed cross correlation output that is representative of an environment in which there is speech in the left direction and snoring in the right direction according to aspects of the present disclosure.
Figure 12:
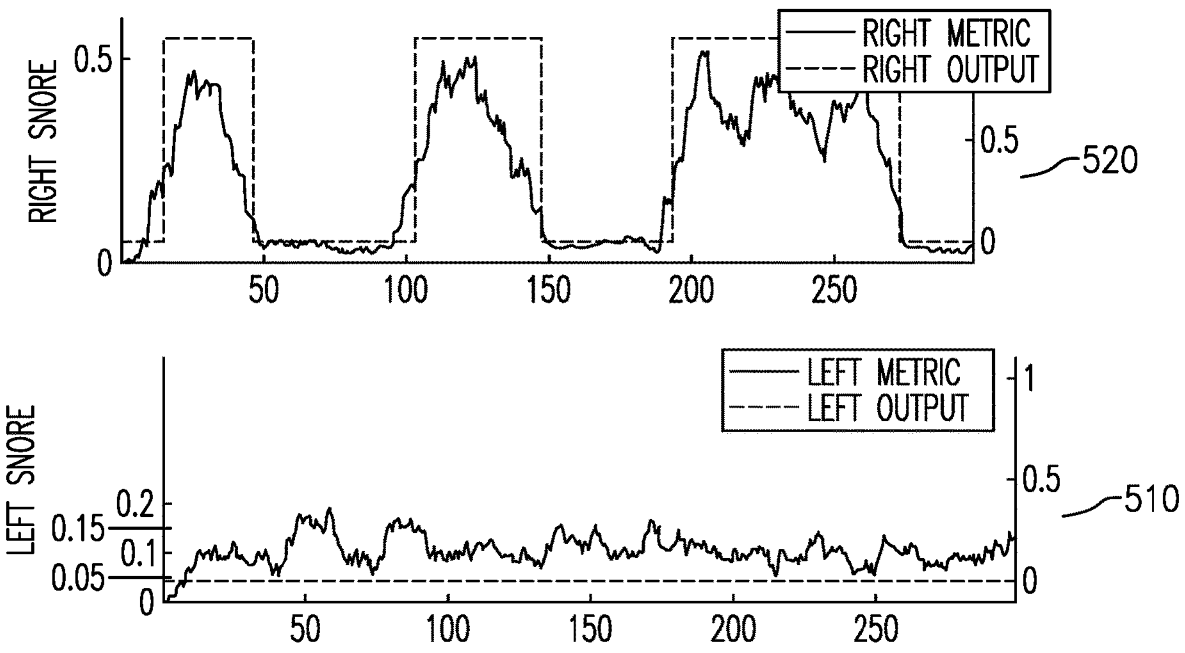
FIG. 12 is a set of graphs depicting the snoring metrics and system outputs obtained from the output of FIG. 11.

According to aspects of the present disclosure, a snoring detection system 100 is provided which is able to indicate the direction from which snoring originates in the presence of other sources of sound. As discussed in more detail above, after isolating sound detected from the left area of interest and right area of interest, the presence of snoring is determined by seeking out a characteristic snoring frequency. By focusing on a characteristic snoring frequency, snoring can be detected even in the presence of a relatively loud non-snoring noise and in the presence of diffuse noise. Examples of such noise include noise from a television or radio, and speech. FIG. 9 shows the smoothed GCCPHAT output 470 (corresponding to block 360 of FIG. 2) for an environment in which there is a relatively loud source of noise originating from an air conditioner in the left area of interest and relatively quiet snoring originating from the right area of interest. FIG. 10 then shows the system output for the left 480 and right 490 areas of interest resulting from the smoothed GCCPHAT output of FIG. 9. Snoring is successfully detected as coming from the right. No snoring is detected as coming from the left. FIG. 11 shows the smoothed GCCPHAT output 500 (corresponding to block 360 of FIG. 2) for an environment in which there is snoring originating from the right area of interest and speech originating from the left area of interest. FIG. 12 shows the system output for the left direction 510 and the system output for the right direction 520 resulting from the smoothed GCCPHAT output of FIG. 11. Snoring is successfully detected as coming from the right. No snoring is detected as coming from the left. FIGS. 9 to 12 demonstrate the ability of the snoring detection system 100 to correctly detect the direction from which snoring originates in the presence of other sources of sound.

According to aspects of the present disclosure, a snoring detection system 100 is provided that is computationally efficient. As described above, the snoring detection system 100 uses computationally efficient techniques such as FFT based cross-correlation to detect the direction of snoring. The method described in FIG. 2 can, therefore, be run on hardware of moderate complexity.

Figure 13:
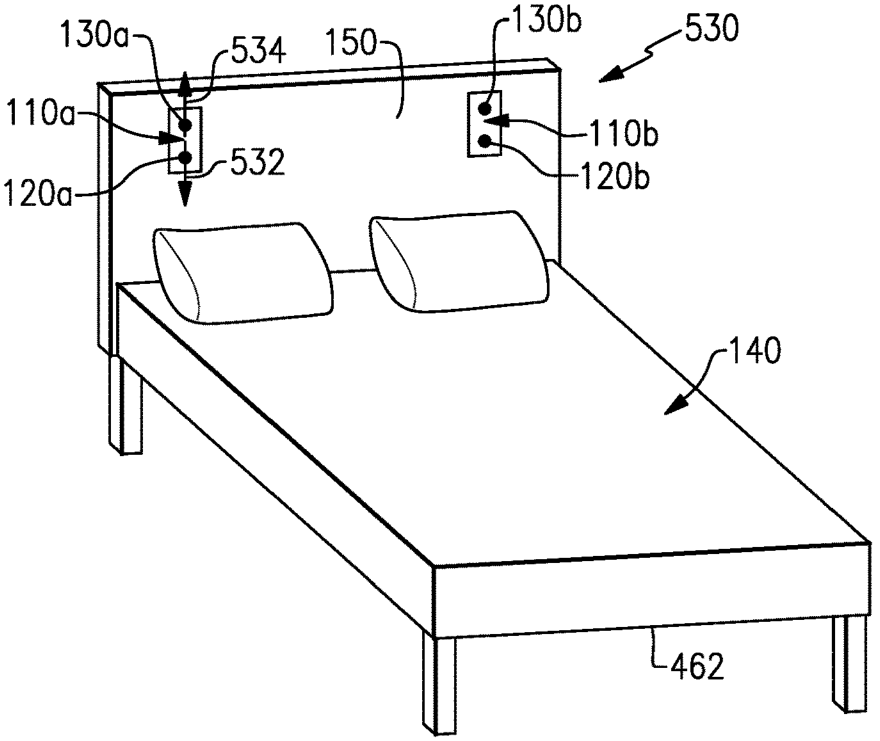
FIG. 13 is a schematic diagram of a second embodiment of a snoring detection system according to aspects of the present disclosure.

An example second embodiment of a snoring detection system 530 according to aspects of the present disclosure is shown in FIG. 13. Like features with previously described embodiments have been given like reference numerals. In this embodiment, the snoring detection system 530 comprises two spatially separated microphone arrays 110*a* and 110*b*, as opposed to the one microphone array 110 of system 100 shown in FIG. 1. The inventors have appreciated that separate microphone arrays can be used to detect sound from the left direction and right direction. Each of the microphone arrays can then be oriented such that the selected areas of interest from the cross correlation outputs cover sound arriving at the array from direction angles corresponding to where a user's head is likely to be positioned on the bed 140. It can then be determined if sound arriving from the area of interest corresponds to a sound produced by snoring.

The two microphone arrays 110*a-b* are positioned in the headboard 150 of bed 140. A first microphone array 110*a* is referred to herein as the left microphone array. A second microphone array 110*b* is referred to herein as the right microphone array. Each microphone array 110*a-b* is similar to the microphone array 110 of the first embodiment described above. However, the orientation of the microphone arrays 110*a-b* is different. This difference in orientation is significant. Each microphone array 110*a-b* is oriented such that a first direction defined from the midpoint between the first and second microphones 120*a-b*, 130*a-b* of the array 110*a-b* towards a position of the first microphone 120*a-b* (indicated by arrow 532) is directed towards the base 462 of bed 140. This direction is referred to herein as the down direction. A second direction defined from the midpoint between the first and second microphones 120*a-b*, 130*a-b* of the array 110*a-b* towards a position of the second microphone 130*a-b* (indicated by arrow 534) is directed away from the base of the bed 140. This direction is referred to herein as the up direction. Such an orientation facilitates focusing the snoring detection on where a user is likely to be positioned on the bed 140.

Figure 14:
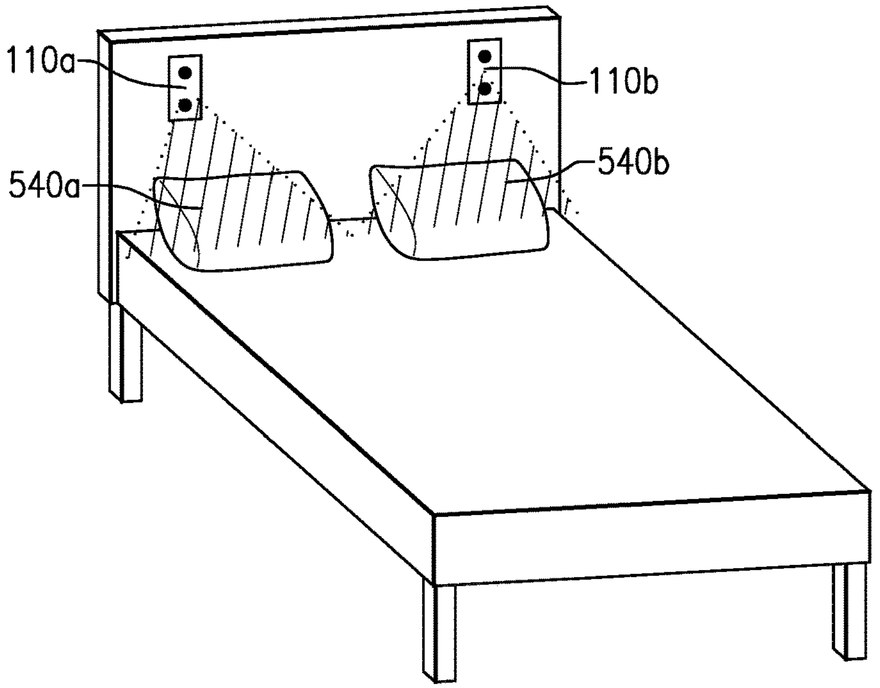
FIG. 14 is the diagram of FIG. 13 further illustrating the areas of interest according to aspects of the present disclosure.

The snoring detection method implemented by system 530 is similar to that described above with reference to the first embodiment. However, the orientation of the microphone arrays 110*a-b* leads to a difference in the areas of interest. Referring now to the example shown in FIG. 13 and the method summarized in FIG. 2, each microphone array 110*a-b* is treated independently. After capturing and cross correlating the audio signals captured by each of the two microphones 120*a-b*, 130*a-b* of a microphone array 110*a-b* (blocks 260 to 290 of FIG. 2), the area of interest is selected (block 330 of FIG. 2). As previously described, this is done by selecting a subset of lags. Whereas with the microphone array 110 orientation shown in FIG. 1, this subset of lags corresponds to direction angles with components in the left and right directions (see FIG. 4), in this embodiment, negative lags correspond direction angles with a component in the up direction. Positive lags correspond to direction angles with a component in the down direction. In other words, a subset of lags corresponds to the sound arriving broadside (a lag of zero) of the microphone array +/− some angles defined by the lags. In the example described herein, negative lags are ignored. This is because the aim is to detect snoring originating from where a user's head is likely to be on the bed 140 during use. The up direction is, therefore, irrelevant. Considering this, instead of looking at lags −n to n, we look at lags 1 to 2n. Typically, the value of n is between 5 and 25 to cover where a user's head is likely to be. Specifically, in the example described herein, n=12. This area of interest is referred to herein as the pillow zone. There is a separate pillow zone corresponding to each of the left and right microphone arrays. In other words, instead of using a single microphone array 110 to determine if a sound produced by snoring is coming from the left or right areas of interest, in this embodiment the left microphone array 110*a* is used to detect snoring coming from a left pillow zone and the right microphone array 110*b* is used to detect snoring coming from a right pillow zone. FIG. 14 illustrates the left and right pillow zones 540*a* and 540*b* respectively.

Figure 15:
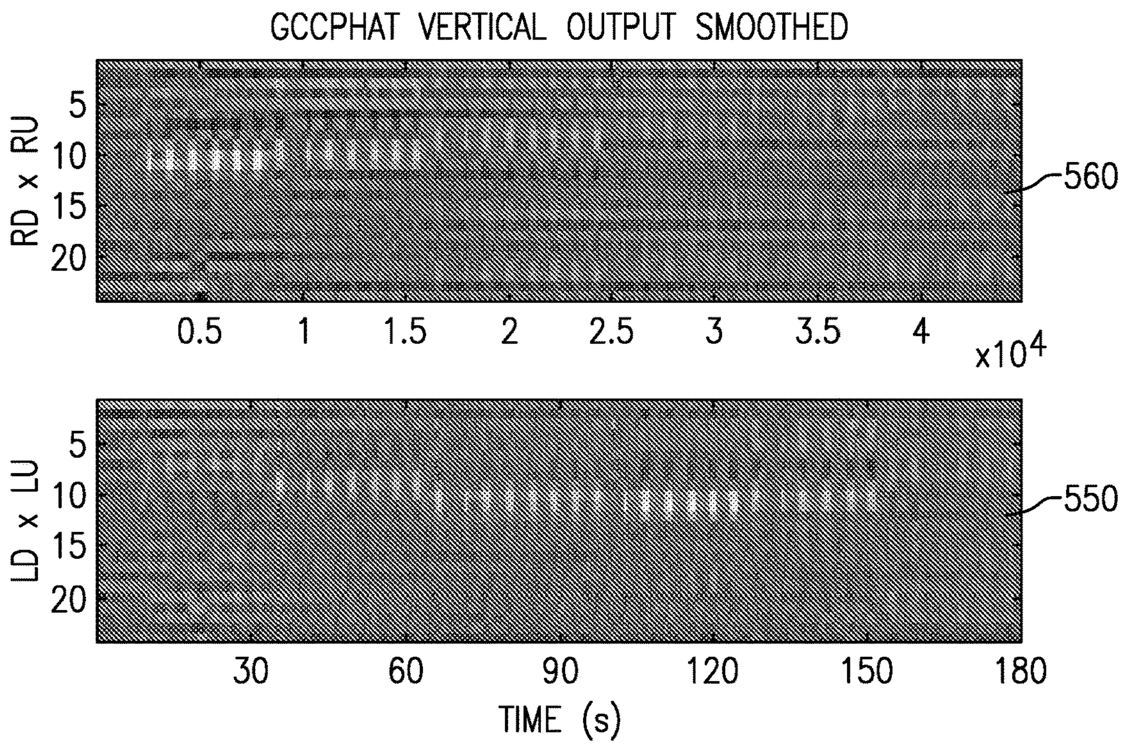
FIG. 15 is a set of signal strength maps depicting the smoothed cross correlation outputs for a subset of lags for the left and right microphone arrays of the system of FIG. 13 according to aspects of the present disclosure.
Figure 16:
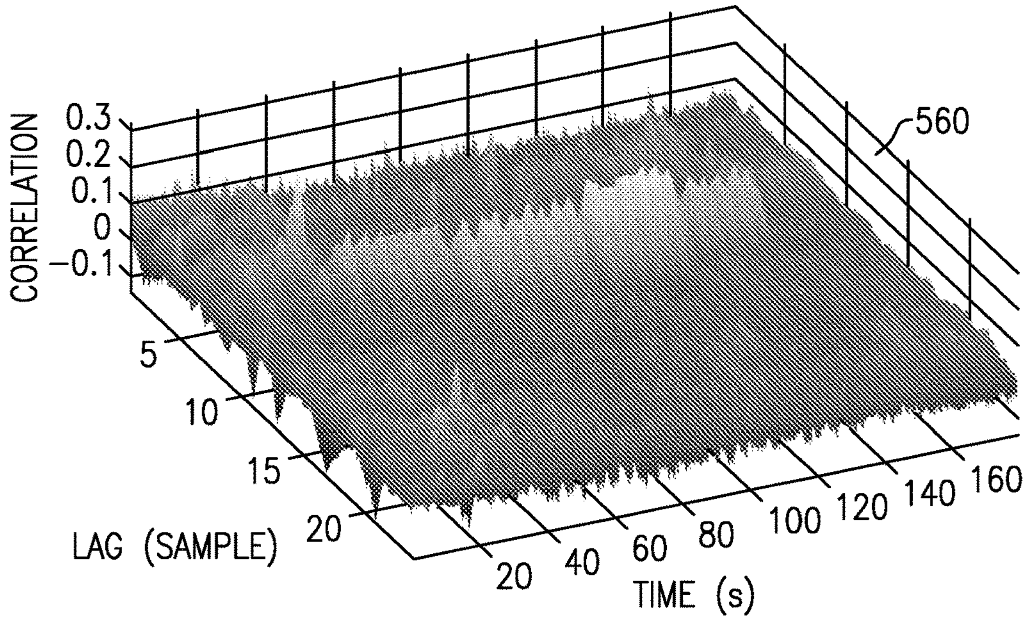
FIG. 16 is a different perspective of the signal strength map for the right microphone array of FIG. 15.
Figure 17:
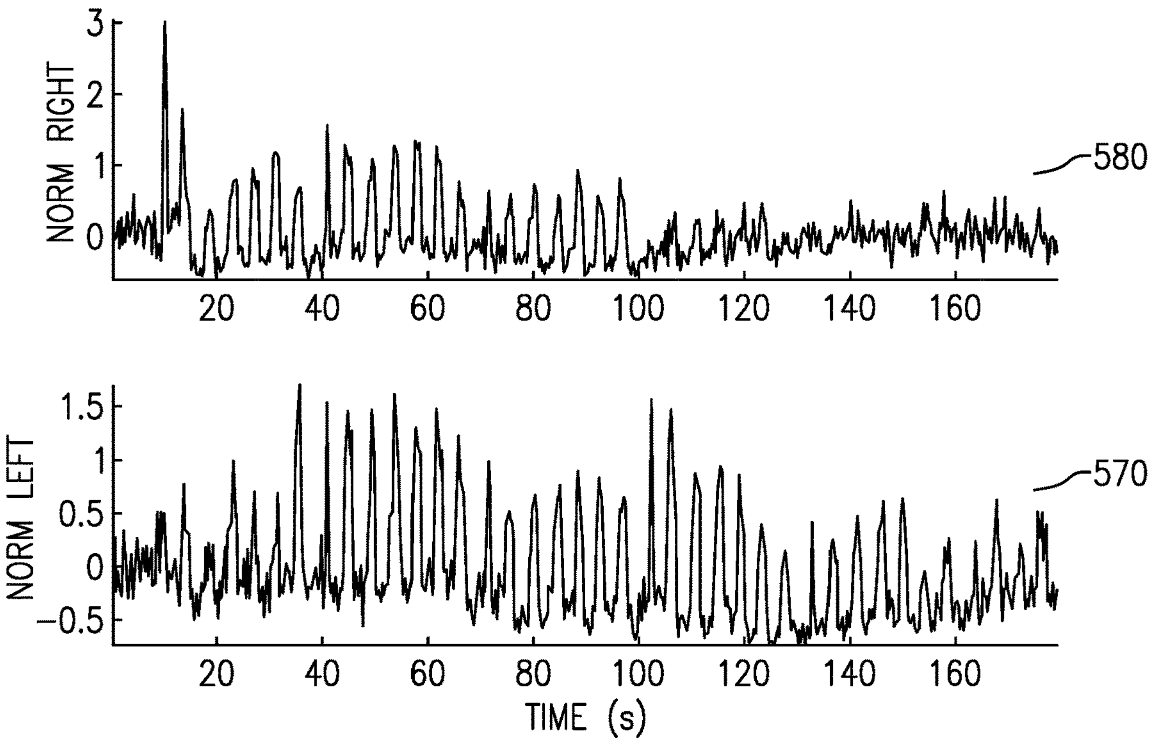
FIG. 17 is a set of graphs depicting the normalized maximum direction signals obtained from the outputs of FIG. 15 according to aspects of the present disclosure.

The data stored in the subset of lags for each of the left microphone array 110*a* and right microphone array 110*b* is processed independently as described above with reference to FIG. 2, blocks 360 to 440. Reference should be made to the appropriate sections of the description above. FIG. 15 shows an example result of the exponential smoothing on the subset of lags (block 360 of FIG. 2). Panel 550 corresponds to the data for the left microphone array 110*a* and panel 560 to the data for the right microphone array 110*b*. The format of the signal strength maps 560, 550 is similar to that of FIG. 6. A different perspective of signal strength map 560 is shown in FIG. 16. In this figure the 'correlation' axis is visible. This perspective highlights the structure of the peaks in the signal strength map 560. FIG. 17 shows the resulting normalized maximum direction signals (block 380 of FIG. 2) for the down direction of both the left microphone array 110*a* (graph 570) and right microphone array 110*b* (graph 580).

Figure 18:
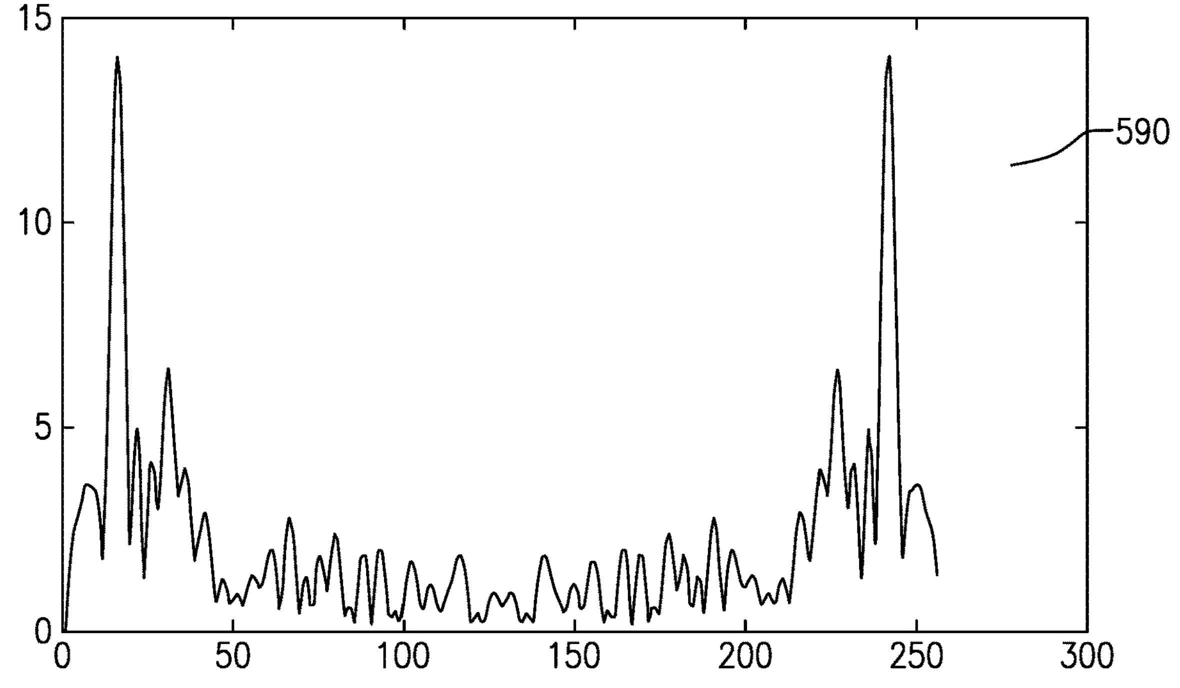
FIG. 18 is a graph depicting a buffer of the magnitude Fast Fourier Transform (FFT) of the signals of FIG. 17 according to aspects of the present disclosure.

The FFT of the normalized maximum direction signal is then computed for the left microphone array 110*a* and right microphone array 110*b* (block 410 of FIG. 2). In the example discussed herein, this is computed as a buffer of the magnitude FFT. This facilitates a long term observation of how the directionality of sound arriving at the microphone array 110 is changing, as discussed above with reference to the first embodiment. Typically, the buffer will be between 10 s and 25 s. A buffer of the magnitude FFT 590 of around 16 s of the normalized maximum direction signals of FIG. 17 is shown in FIG. 18. The buffer shown is at t=80 s, where t denotes time. The buffer holds the magnitude FFT of the normalized left and right maximum direction signals from approximately t=64 s to t=80 s.

Figure 19:
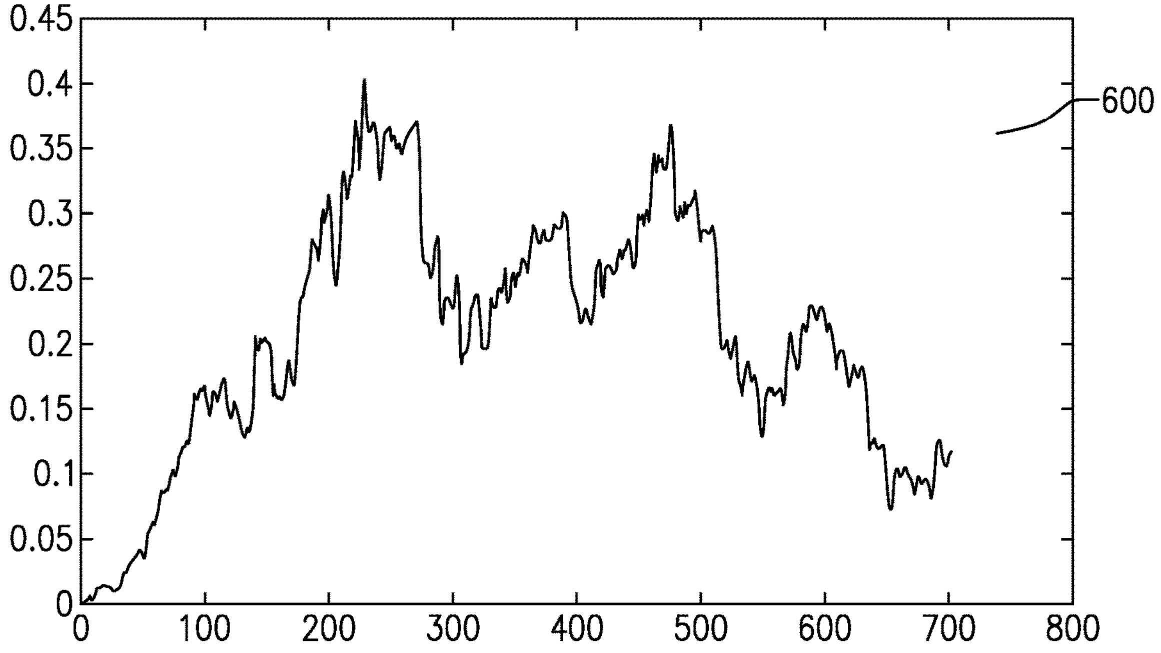
FIG. 19 is a graph depicting a snoring metric obtained from the FFT of FIG. 18 according to aspects of the present.

From the Fourier transform, it is determined if a component corresponding to the characteristic breathing rate (1.5 s to 6 s per breath) is present. In the example shown in FIG. 18, the bins that represent this characteristic breathing range are bins 11 to 43. To calculate the snoring metric (block 430 of FIG. 2), for each of the left and right microphone arrays, the minimum value in these bins is subtracted from the maximum value. The result is divided by the window size (i.e. number of frames) for normalization. In this example, the number of frames is 64, dictated by the number of bins representing the characteristic breathing range. FIG. 19 shows an example snoring metric 600 calculated in this way. The snoring metric essentially captures how the buffer FFT is changing over time.

Figure 20:
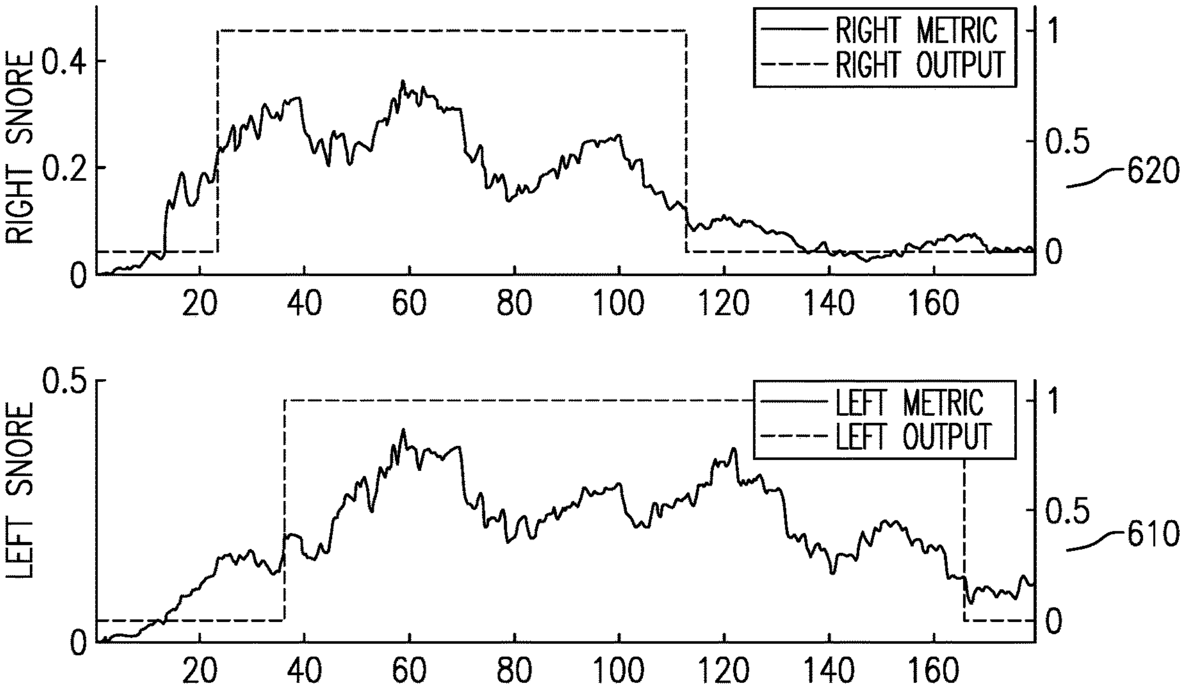
FIG. 20 is a set of graphs depicting the snoring metrics and system outputs obtained from the signals of FIG. 17 according to aspects of the present disclosure.

The above process gives rise to a snoring metric for the left microphone array 110*a* and a snoring metric for the right microphone array 110*b*. As discussed above, two thresholds are used to determine if the maximum direction signals corresponding to each array comprise a component consistent with a sound produced by snoring. FIG. 20 shows the snoring metric for the left array and right array resulting from the maximum direction signals of FIG. 17. Graph 610 shows the snoring metric for the left microphone array 110*a* and graph 620 shows the snoring metric for the right microphone array 110*b*. The system output is superimposed on the graphs 610, 620. As before, an output of 1 corresponds to snoring being detected. An output of 0 corresponds to no snoring detected. In the example shown in FIG. 20, snoring is detected from both the maximum direction signal 570 corresponding to the left microphone 110*a* array and the maximum direction signal 580 corresponding to the right microphone array 110*b*. Physically, this means there is snoring detected as coming from both pillow zones 540*a-b*.

Snoring detection system 530 provides the same advantages as discussed above for snoring detection system 100.

This embodiment further provides the ability to focus the snoring detection on an area of interest 540*a-b*. This area of interest is chosen to correspond to where a user's head is likely to be positioned during use. This is, therefore, where sounds consistent with snoring are most likely to originate.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A system for detecting a sound generated by an entity during sleep, the entity being located within a first area of interest or a second area of interest separated from the first area of interest, the system comprising:
- a microphone array configured to focus on detecting sound arriving from the first area of interest and the second area of interest, the microphone array including
  - a first microphone configured to convert a first sound into a first electrical signal, and
  - a second microphone configured to convert a second sound into a second electrical signal, the first and second microphones being spatially separated; and
- a processor configured to generate a third electrical signal from the first electrical signal and the second electrical signal, the third electrical signal being representative of the first sound arriving at the first microphone and the second sound arriving at the second microphone from a plurality of directions, to select a first portion of the third electrical signal, the first portion corresponding to the first sound arriving at the first microphone and the second sound arriving at the second microphone from a direction of interest at each of a plurality of sample points, the direction of interest corresponding to the first area of interest or the second area of interest, to select a second portion of the third electrical signal, the second portion containing only components of the first portion that have a frequency within a frequency range of interest, to derive a metric from the second portion of the third electrical signal, the metric indicating if the first portion of the third electrical signal includes a component consistent with a sound generated by the entity during sleep, and to generate an output if the metric indicates that the first portion of the third electrical signal includes a component consistent with the sound generated by the entity during sleep.

2. The system of claim 1 wherein the third electrical signal is based on a cross correlation between the first electrical signal and the second electrical signal.

3. The system of claim 2 wherein the cross correlation uses a Fast Fourier transform to generate a Fourier transform of the first electrical signal and the second electrical signal.

4. The system of claim 3 wherein the Fourier transform of the first electrical signal and the second electrical signal is generated between every 2 milliseconds to 6 milliseconds.

5. The system of claim 3 wherein the Fast Fourier transform is a 256 point Fast Fourier transform.

6. The system of claim 2 wherein an output of the cross correlation includes correlation for a plurality of time delays in arrival between the first sound at the first microphone and the second sound at the second microphone.

7. The system of claim 6 wherein each of the plurality of time delays in arrival corresponds to the first sound arriving at the first microphone and the second sound arriving at the second microphone from a physical direction at a sample point.

8. The system of claim 7 wherein the first portion of the third electrical signal includes a subset of the output, the subset having time delays in arrival that correspond to the first area of interest or the second area of interest.

9. The system of claim 8 wherein the processor is further configured to smooth the subset of the output from frame to frame to reduce noise in the subset using exponential smoothing.

10. The system of claim 8 wherein the first portion of the third electrical signal includes a maximum signal from the subset of the output at each sample point.

11. The system of claim 10 wherein the first portion of the third electrical signal is representative of how the physical direction from which the first sound arrives at the first microphone and the second sound arrives at the second microphone changes in time.

12. The system of claim 10 wherein the processor is further configured to normalize the first portion of the third electrical signal.

13. The system of claim 1 wherein the second portion of the third electrical signal is based on a Fourier transform of the first portion of the third electrical signal.

14. The system of claim 13 wherein the Fourier transform of the first portion of the third electrical signal is generated using a Fast Fourier transform, and wherein the Fast Fourier transform includes a buffer of a magnitude of the Fast Fourier transform of the first portion of the third electrical signal.

15. The system of claim 13 wherein the second portion of the third electrical signal includes a subset of the Fourier transform, the subset corresponding to the frequency range of interest.

16. The system of claim 15 wherein the frequency range of interest corresponds to a characteristic frequency range of the sound generated by the entity during sleep, and wherein the sound generated by the entity during sleep is a sound generated by the entity snoring.

17. The system of claim 16 wherein the frequency range of interest corresponds to a breathing rate of 1.5 seconds per breath to 6 seconds per breath.

18. The system of claim 15 wherein the metric is based on a difference between a maximum value and a minimum value in the subset of the Fourier transform, and, wherein the metric varies with time.

19. The system of claim 18 wherein the metric indicates that the first portion of the third electrical signal comprises a component consistent with a sound produced by an entity during sleep if the metric rises above a first threshold, and wherein the processor is further configured to indicate that the first portion of the third electrical signal no longer comprises a component consistent with the sound generated by the entity during sleep if the metric subsequently falls below a second threshold.

20. The system of claim 1 wherein a first direction is defined from a point between the first microphone and the second microphone towards a position of the first microphone, and wherein an angle corresponding to the direction of interest comprises a component in the first direction.

21. The system of claim 20 wherein the processor is further configured to select a third portion of the third electrical signal, the third portion corresponding to the first sound arriving at the first microphone and the second sound arriving at the second microphone from a second direction of interest.

22. The system of claim 21 wherein a second direction is defined from a point between the first microphone and the second microphone towards a position of the second microphone, and wherein an angle corresponding to the second direction of interest comprises a component in the second direction.

* * * * *